(12) United States Patent
Shrivastava et al.

(10) Patent No.: US 11,728,537 B2
(45) Date of Patent: Aug. 15, 2023

(54) OPPORTUNISTIC SYSTEM AND METHOD FOR BATTERY COOLING WHILE CHARGING ON-PLUG

(71) Applicant: Ford Global Technologies, LLC, Dearborn, MI (US)

(72) Inventors: Rohan Shrivastava, Livonia, MI (US); Joseph George, Canton, MI (US); Jordan Mazaira, Taylor, MI (US); Alexandria Schardt, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 16/777,483

(22) Filed: Jan. 30, 2020

(65) Prior Publication Data

US 2021/0242518 A1     Aug. 5, 2021

(51) Int. Cl.
  H01M 10/663 (2014.01)
  H01M 10/625 (2014.01)
  (Continued)

(52) U.S. Cl.
  CPC ....... *H01M 10/663* (2015.04); *H01M 10/625* (2015.04); *H01M 10/6561* (2015.04); *H02J 7/00041* (2020.01); *B60H 1/00278* (2013.01); *B60H 1/143* (2013.01); *B60H 1/2221* (2013.01); *B60K 2001/005* (2013.01); *B60L 1/04* (2013.01); *B60L 53/11* (2019.02); *B60L 58/26* (2019.02); *B60L 2240/34* (2013.01); *B60L 2240/545* (2013.01); *B60L 2240/662* (2013.01); *H01M 10/613* (2015.04); *H01M 10/63* (2015.04);
  (Continued)

(58) Field of Classification Search
  CPC .. B60H 1/00278; B60H 1/143; B60H 1/2221; B60K 2001/005; B60L 1/04; B60L 2240/34; B60L 2240/545; B60L 2240/662; B60L 53/11; B60L 58/26; H01M 10/613; H01M 10/625; H01M 10/63; H01M 10/6561; H01M 10/663; H01M 2220/20; H02J 7/00041; Y02E 60/10; Y02T 10/70; Y02T 10/7072; Y02T 10/72; Y02T 90/14; Y02T 90/16
  See application file for complete search history.

(56) References Cited

U.S. PATENT DOCUMENTS 6,481,230 B2   11/2002   Kimishima et al.
9,105,951 B2   8/2015    Anderson-Straley et al.
(Continued)

FOREIGN PATENT DOCUMENTS

KR    101619549 B1    5/2016

*Primary Examiner* — Lingwen R Zeng
(74) *Attorney, Agent, or Firm* — Burr & Forman LLP; David Kelley

(57) ABSTRACT

A control assembly for a thermal management system for a high voltage battery of a plug-in electric vehicle may include a control valve and a control module. The control valve may be operable to control a flow of battery coolant to the high voltage battery from a refrigerant cooling circuit and from a cabin heater core cooling circuit. The control module may be configured to selectively operate the control valve to select a cooling mode, including a refrigerant only mode, a core mode, and a combined mode in which both the refrigerant cooling circuit and the cabin heater core cooling circuit provide cooling to the high voltage battery.

18 Claims, 5 Drawing Sheets

(51) Int. Cl.
*H02J 7/00* (2006.01)
*H01M 10/6561* (2014.01)
*B60H 1/14* (2006.01)
*B60H 1/22* (2006.01)
*B60H 1/00* (2006.01)
*H01M 10/63* (2014.01)
*B60L 1/04* (2006.01)
*B60L 58/26* (2019.01)
*B60K 1/00* (2006.01)
*H01M 10/613* (2014.01)
*B60L 53/10* (2019.01)

(52) U.S. Cl.
CPC .......... *H01M 2220/20* (2013.01); *Y02E 60/10* (2013.01); *Y02T 10/70* (2013.01); *Y02T 10/7072* (2013.01); *Y02T 10/72* (2013.01); *Y02T 90/14* (2013.01); *Y02T 90/16* (2013.01)

(56) References Cited

U.S. PATENT DOCUMENTS

| | | |
|---|---|---|
| 2014/0012447 A1 | 1/2014 | Gao et al. |
| 2017/0229747 A1* | 8/2017 | Jung .................. H01M 10/613 |
| 2018/0222286 A1 | 8/2018 | Blatchley et al. |

* cited by examiner

OPPORTUNISTIC SYSTEM AND METHOD FOR BATTERY COOLING WHILE CHARGING ON-PLUG

TECHNICAL FIELD

Example embodiments generally relate to hybrid vehicle systems and, more particularly, relate to systems and methods for opportunistically cooling the battery while charging on-plug is underway.

BACKGROUND

Plug-in electric vehicles such as hybrid electric vehicles (PHEV) and battery electric vehicles (BEV) have an electric powertrain that is powered by a high voltage battery unit. The battery unit produces heat due to electrical losses during both charging and discharging of the battery unit. Accordingly, plug-in electric vehicles typically include a thermal management system that is configured to provide cooling for the battery unit. By maintaining temperatures in the battery unit within allowable ranges, maximum capabilities of the battery unit may be achieved and the useful life of the battery unit may also be extended.

For a system that utilizes coolant to provide cooling to the battery unit, if an outside heat exchanger (e.g., a radiator) is available within the system, then the vehicle can utilize a low cost (e.g., auxiliary load) cooling from the environment to cool the coolant that is used for cooling the battery unit. However, if no radiator is present, which is typically the case for plug-in electric vehicles, the system will often instead use a refrigerant system in order to cool the coolant that is then used to cool the battery unit.

When the refrigerant system is employed during charging of the battery unit, the power from the refrigerant system can be taken from the wall charging unit instead of requiring battery discharge to power the refrigerant system. However, even if the power is taken from the wall charging unit, the speed at which the charging of the battery unit is accomplished may be reduced due to the diversion of some of the wall charging unit's power to the refrigerant system. This could result in a slower charge or, if the time available to charge is limited, a reduction in the range of the vehicle. In any case, the range per time of charge may be reduced.

Thus, it may be desirable to develop an alternative strategy for enabling the battery unit to be cooled while on-plug (i.e., while being powered from the wall charging unit (or charger)). By doing so, vehicle range gained in a given time of charging may be increased, charge times may be decreased, and customer satisfaction may also be improved.

BRIEF SUMMARY OF SOME EXAMPLES

In accordance with an example embodiment, a thermal management system for a plug-in electric vehicle is provided. The system includes a high voltage battery configured to power the vehicle, a refrigerant cooling circuit configured to be selectively operably coupled to the high voltage battery to cool the high voltage battery during charging of the vehicle, a cabin heater core cooling circuit configured to be selectively operably coupled to the high voltage battery to cool the high voltage battery during charging of the vehicle, a control valve operable to control a flow of battery coolant to the high voltage battery from the refrigerant cooling circuit and the cabin heater core cooling circuit, and a control module configured to selectively operate the control valve to select a mode of cooling the high voltage battery. At least one mode of cooling selectable by the control module is a combined mode in which both the refrigerant cooling circuit and the cabin heater core cooling circuit provide cooling to the high voltage battery.

In another example embodiment, a control assembly for a thermal management system for a high voltage battery for a plug-in electric vehicle is provided. The control assembly may include a control valve and a control module. The control valve may be operable to control a flow of battery coolant to the high voltage battery from a refrigerant cooling circuit and from a cabin heater core cooling circuit. The control module may be configured to selectively operate the control valve to select a cooling mode, including a refrigerant only mode, a core mode, and a combined mode in which both the refrigerant cooling circuit and the cabin heater core cooling circuit provide cooling to the high voltage battery.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
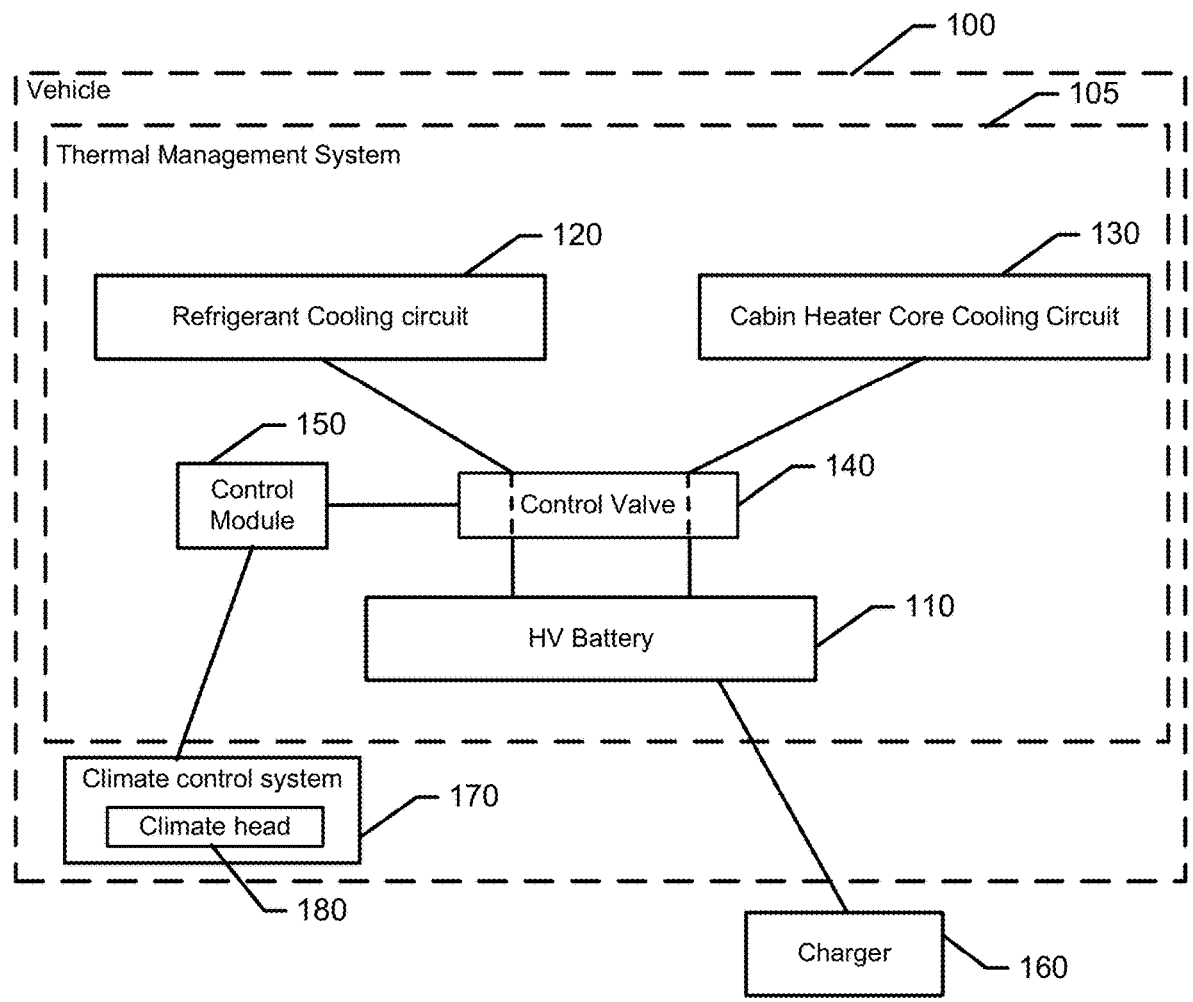
FIG. 1 illustrates a block diagram of a thermal management system of a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide an improved design for opportunistically cooling the battery unit during charging (i.e., when the vehicle is on-plug). In this regard, example embodiments may enable the vehicle to intelligently select from among multiple modes of cooling the battery unit while on-plug in to ensure that the most advantageous mode for current conditions is selected. Some examples of components and structures that can be employed in order to implement example embodiments will be discussed below.

FIG. 1 illustrates a block diagram of cooling circuits of a vehicle 100 (e.g., a plug-in electric vehicle) of an example embodiment. As shown in FIG. 1, the vehicle 100 may include a thermal management system 105 that may be used to cool a high voltage battery 110 of the vehicle 100. Thus, for example, the thermal management system 105 may include a refrigerant coolant circuit 120 and a cabin heater core cooling circuit 130 that may each be configured to act as a heat sink or otherwise remove heat from the high voltage battery 110 via operations discussed in greater detail below. The refrigerant cooling circuit 120 and the cabin heater core cooling circuit 130 may each also be operably coupled to a control valve 140 that operates responsive to instructions received from a control module 150. The control valve 140 and the control module 150 may together be considered to form a control assembly of the thermal management system 105. In some cases, the control valve 140 may be configured to enable or stop the flow through either or both of the refrigerant cooling circuit 120 and the cabin heater core cooling circuit 130. The control valve 140 may also or alternatively be configured to enable throttling of flow through either or both of the refrigerant cooling circuit 120 and the cabin heater core cooling circuit 130. As such, the control valve 140 may act as or be embodied as a proportional valve that can change the proportion of the cooling flow to the high voltage battery 110 that is provided from the refrigerant cooling circuit 120 and the cabin heater core cooling circuit 130 when the high voltage battery 110 is on-plug (e.g., being charged from a charger 160).

The control module 150 may be embodied as a powertrain control module (PCM) in some cases. However, the control module 150 could be embodied as a different control module (e.g., a hybrid PCM, or HPCM) of the vehicle 100 in other cases. The control module 150 may include processing circuitry (e.g., one or more instances of a microprocessor or controller and corresponding memory for storing instructions, applications, or control related programs for controlling various aspects associated with operation of the engine (e.g., via an engine control unit (ECU)) and/or transmission (e.g., via a transmission control unit (TCU)). In some cases, the control module 150 may be configured to receive information from various sensors and/or components of the thermal management system 105 and/or the vehicle 100. Based on the information received, the control module 150 may determine which cooling mode to select for providing cooling to the high voltage battery 110.

In an example embodiment, the cooling modes from which the control module 150 may select may be related to which of the cooling circuits (e.g., the refrigerant cooling circuit 120 and the cabin heater core cooling circuit 130) to employ for cooling the high voltage battery 110 and/or in what combination (e.g., on a proportional basis). Thus, for example, one mode may include use of only the refrigerant cooling circuit 120, another mode may include use of only the cabin heater core cooling circuit 130, and a third mode may include some combination of cooling from each of the refrigerant cooling circuit 120 and the cabin heater core cooling circuit 130. The third mode (i.e., the combined mode) may further enable the proportional contributions of the refrigerant cooling circuit 120 and the cabin heater core cooling circuit 130 to be controlled by the control module 150 (e.g., by positioning the control valve 140 to throttle flow contributions accordingly).

As will be discussed in greater detail below, the control module 150 may also interface with a climate control system 170 of the vehicle 100. Moreover, in some cases, the control module 150 may interface with a climate head 180 of the climate control system 170. The climate control system 170 (via the climate head 180 and various other components thereof) may be configured to enable the operator or customer to provide cabin climate control inputs (e.g., for heating and/or cooling of the cabin of the vehicle 100 for the comfort of the operator or customer).

Figure 2:
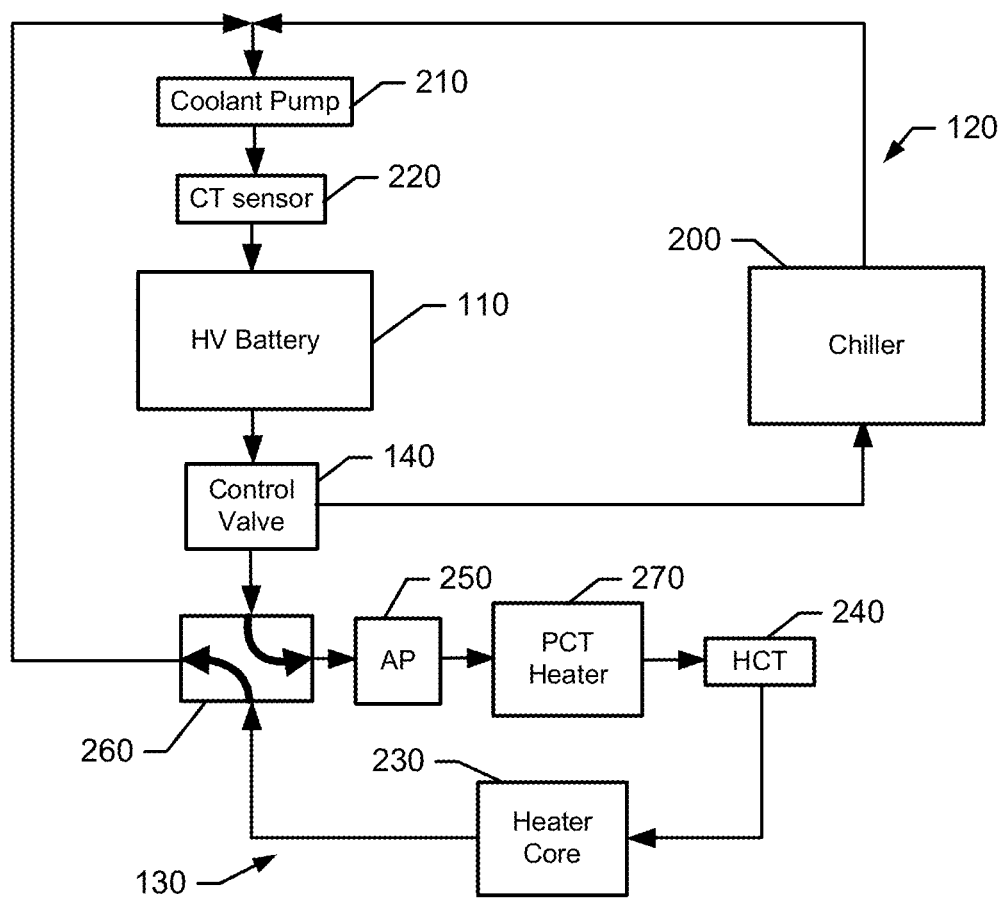
FIG. 2 illustrates a concept view of certain components associated with the thermal management system in a combined mode in accordance with an example embodiment.
Figure 3:
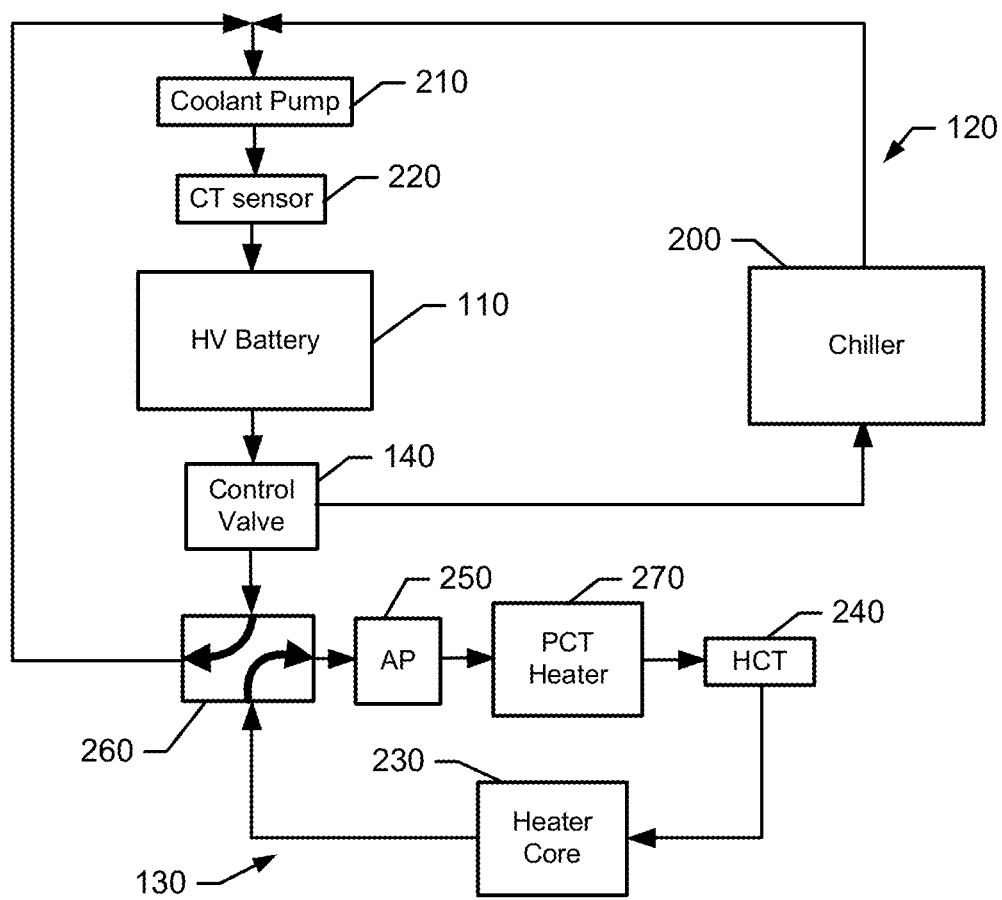
FIG. 3 illustrates a concept view of certain components associated with the thermal management system in an isolated mode in accordance with an example embodiment.

FIGS. 2 and 3 illustrate examples of operation of the system described above in connection with disclosure of some specific structures or components that may be employed in an example embodiment. Referring now to FIGS. 2 and 3, the refrigerant cooling circuit 120 may include a chiller 200 or other refrigeration unit that can be powered from the high voltage battery 110 (or other onboard power sources of the vehicle 100). A coolant pump 210 and a coolant temperature sensor 220 may also be part of the refrigerant cooling circuit 120 when the control valve 140 is positioned to allow flow through the chiller 200.

The cabin heater core cooling circuit 130 may include a heater core 230 and a heater core temperature sensor 240. In some embodiments, the cabin heater core cooling circuit 130 may further include an auxiliary pump 250 configured to provide flow through the cabin heater core cooling circuit 130 (e.g., when the cabin heater core cooling circuit 130 is isolated as shown in FIG. 3). Isolation of the cabin heater core cooling circuit 130 from the high voltage battery 110 may be accomplished by repositioning a heater core isolation valve 260 (e.g., a four-way valve) to an isolation position (shown in FIG. 3). Meanwhile, the cabin heater core cooling circuit 130 may be connected in combination with the refrigerant cooling circuit 120 by positioning the heater core isolation valve 260 to a combined loop position as shown in FIG. 2.

Although not required for practicing example embodiments, the cabin heater core cooling circuit 130 may also include a positive temperature coefficient (PTC) heater 270, which may be used to provide cabin heating to raise the temperature of the cabin. The PTC heater 270 will generally be off during the battery cooling modes described herein.

The coolant pump 210 may therefore be configured to drive flow through the high voltage battery 110 from either or both of the refrigerant cooling circuit 120 and the cabin heater core cooling circuit 130. Thus, for the first mode of cooling (i.e., only using the refrigerant cooling circuit 120), the heater control isolation valve 260 may be in the isolation position shown in FIG. 3. Coolant may therefore flow through the chiller 200 and the coolant pump 210 and ultimately through the high voltage battery 110 before returning to the chiller via the control valve 140, which may be opened with respect to allowing flow in the refrigerant cooling circuit 120).

For the second mode of cooling, (i.e., using only the cabin heater core cooling circuit 130), the heater core isolation valve 260 may be placed in the combined loop position of FIG. 2, and the control valve 140 may be positioned to minimize or prevent flow through the refrigerant cooling circuit 120. Thus, coolant flow may be driven through the high voltage battery 110, the control valve 140, the heater core isolation valve 260, the heater core 230 and back through the heater core isolation valve 260. The coolant flow may be driven by either the coolant pump 210 or the auxiliary pump 250. However, in some cases, the auxiliary pump 250 may be preferred, since the auxiliary pump 250 may be a smaller electrical load than the coolant pump 210.

For the third mode of cooling (i.e., using both the refrigerant cooling circuit 120 and the cabin heater core cooling circuit 130), the heater core isolation valve 260 may be placed in the combined loop position of FIG. 2. Meanwhile, the control valve 140 may be placed in a position that allows flow to be distributed into both the refrigerant cooling circuit 120 and the cabin heater core cooling circuit 130 in a selected proportion. The flow may be driven by the coolant pump 210 (with or without any assistance from the auxiliary pump 250).

As noted above, the control module 150 may be configured to select the mode of cooling (or operation) based on conditions detected by various sensors in the system. Thus, for example, the control module 150 may be configured to direct positioning of the control valve 140 and the heater core isolation valve 260 to achieve the selected mode. The control module 150 may also be configured to select the coolant pump 210 and/or the auxiliary pump 250 to be powered for operation to achieve the selected mode.

In an example embodiment, the second mode of cooling may generally be the preferred mode, if available. In this regard, since the second mode of cooling uses only the cabin heater core cooling circuit 130, which is an opportunistic cooling mode that minimizes the power drawn (either from the high voltage battery 110 or the charger 160) to support the cooling operations associated therewith, the charging efficiency of the high voltage battery 110 may be increased. The second mode of cooling generally employs a relatively low cost cooling method (i.e., the heater core 230) and the auxiliary pump 250, which is also a small load. The control module 150 may be configured to determine whether the vehicle 100 is on-plug (i.e., plugged in to the charger 160) and determine whether the climate system responsible for heating or cooling the cabin has been requested. The climate system is generally requested if a user is present in the vehicle or when preconditioning (i.e., providing conditioned air into the cabin in preparation for a future departure time of the vehicle 100) has been requested. The control module 150 will also determine ambient temperature in order to determine whether cooling via the second mode of cooling is possible. As such, for example, when the ambient temperature is less than a threshold ambient temperature, the air that can be pulled in from ambient to pass through the heater core 230 (e.g., via operation of the auxiliary pump 250) may be cool enough to dissipate heat from the high voltage battery 110 into the cabin thereby providing cooling to the battery coolant with minimum additional energy usage in order to operate the thermal management system 105.

Meanwhile, the third mode of cooling (i.e., the combined mode) may be the second highest ranked mode of cooling in terms of priority since the third mode of cooling may use the cabin heater core cooling circuit 130 at least to some degree to thereby reduce the amount of contribution (and therefore the corresponding energy draw also) required by the chiller 200. If the first mode of cooling is not sufficient (e.g., as indicated by continued rise of battery temperature or battery coolant temperature while the first mode of cooling has been employed), the combined mode may be selected. Implementation of the combined mode may initially be conducted with a relatively low proportional flow through the refrigerant cooling circuit 120 in order to minimize the load on the chiller 200 and reduce the efficiency impact on charging. The proportional flow can then be adjusted to increase load on the chiller 200 as long as battery coolant temperature or battery temperature continue to rise, or when the battery coolant temperature or battery temperature rises to a threshold. Thus, for example, the control valve 140 may be positioned by the control module 150 based on minimizing an amount of the battery coolant flow from the refrigerant cooling circuit 120 and increasing the amount of the battery coolant flow from the refrigerant cooling circuit 120 as needed to maintain a temperature of the high voltage battery within a predefined range of temperatures, or below a given temperature. However, the effectiveness of the second mode of cooling also depends on the ambient temperature. Thus, if ambient temperature rises, the effectiveness of the second mode of cooling (either by itself or in combination with chiller 200 operation) may decrease. As such, insufficient cooling could be caused either by ambient temperature rise, or by too much heat being produced by the high voltage battery 110 during charging (e.g., due to high current or fast DC charging).

As can be appreciated from the discussion above, the first mode of cooling (i.e., using only the refrigerant cooling circuit 120) may be the least preferred mode of cooling. When ambient temperatures are too high to support the second mode of cooling or the third mode of cooling, then low energy modes of cooling may not be available or effective. Thus, the battery coolant and high voltage battery 110 may be cooled using only the chiller 200 and the refrigerant cooling circuit 120.

By employing the heater core 230 as a heat sink for the high voltage battery 110 (either alone or in combination with the chiller 200), the amount of power required from the charger 160 to be diverted from charging and instead used for cooling can be reduced. Thus, during a DC fast charge, which may charge the high voltage battery 110 with higher than driving currents and therefore generate larger heat loads that need to be removed, if the ambient temperature is low enough, the heat sink provided by the heater core 230 may be sufficient to enable the cabin to be heated (thereby reducing load on the climate system for preconditioning and/or during operation of the vehicle 100 immediately after the start of a drive event after charging). The control module 150 may therefore enable the most effective and efficient cooling method to be selected based on ambient temperature and whether or not climate conditioning is requested. Example embodiments may not only reduce the amount of energy diverted from the charger 160, but if the charger 160 has a relatively low capacity and cannot support full power operation of the chiller 200 while charging, using the combined mode described above may actually enable charging to be provided efficiently and effectively by proportionally controlling the contribution to cooling that is provided by the charger 160.

Figure 4:
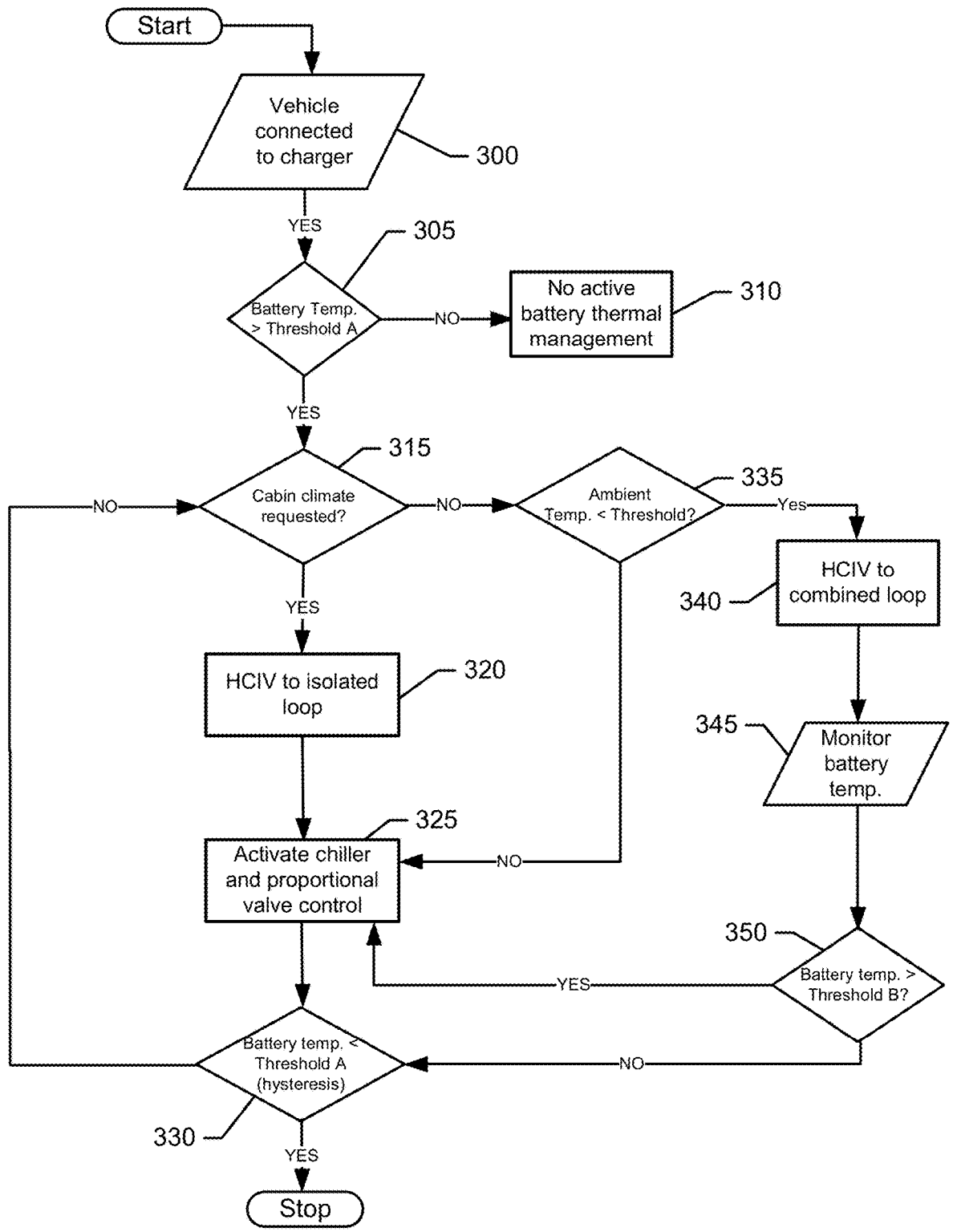
FIG. 4 is a flow chart defining a decision tree that may be employed by a control module in connection with selecting or controlling a mode of cooling of a high voltage battery of the vehicle in accordance with an example embodiment.

FIG. 4 illustrates a flow chart indicating a decision tree that may be employed by the control module 150 in connection with selecting or controlling the mode of cooling in the manner described above while the vehicle 100 is on-plug. In this regard, as shown in FIG. 4, an initial determination may be made as to whether the vehicle is connected to a charger (i.e., plugged in or on-plug) at operation 300. If on-plug, a determination may next be made as to charging operations are active and battery temperature (which may be indicated by battery coolant temperature) is above a threshold value (e.g., about 15° C. to about 20° C.) at operation 305. If charging is not active or if the battery temperature is below the threshold value, then no active battery thermal management may be needed as indicated at operation 310. Thus, none of the cooling modes described above may be selected. If charging is active and battery temperature is above the threshold value, then flow may continue to operation 315.

At operation 315, a determination may be made as to whether cabin climate control has been requested (e.g., via the climate control system 170). If cabin climate control has been requested, then the heater core isolation valve 260 may be placed in the isolated loop position (thereby isolating the heater core 230 from the high voltage battery 110) at operation 320. This is necessary since the heater core 230 is being used for cabin climate control, and cannot be used as a heat sink for the high voltage battery 110. The chiller 200 may then be activated, and the control valve 140 may be positioned to provide cooling to the high voltage battery pack at operation 325. As noted above, operation of the chiller 200 in the isolated loop position is the first mode of cooling. Thereafter, battery temperature may be monitored (directly or indirectly via battery coolant temperature) to determine if battery temperature is below the threshold value at operation 330. If battery temperature is below the threshold value, then the sequence of operations may stop. If battery temperature remains above the threshold value, then flow may return to operation 315 above.

If cabin climate control has not been requested at operation 315, then a determination may be made at operation 335 as to whether ambient temperature is below an ambient temperature threshold (e.g., about 3-5° C.). If ambient temperature is not below the ambient temperature threshold (i.e., it is warmer than the ambient threshold), then it may not be possible to use the heater core 230 as a heat sink even though the heater core 230 is not being used for climate control. Accordingly, if ambient temperature is not below the ambient temperature threshold, flow may return to operation 325 and the first mode of cooling may be employed.

If, however, the ambient temperature is below the ambient temperature threshold at operation 335, then it may be possible to use the heater core 230 as a heat sink for the high voltage battery 110. Thus, the heater core isolation valve 260 may be placed in the combined loop position at operation 340. At this point, the chiller 200 is not operational, so the system is in the second mode of cooling (i.e., using only the cabin heater core cooling circuit 130). The battery temperature may then be monitored (e.g., directly or indirectly) at operation 345 to determine whether it is feasible to cool the high voltage battery 110 only in the second mode of cooling, or if the chiller 200 should be engaged. At operation 350, a comparison of battery temperature may be made to a second battery temperature threshold. The second battery temperature threshold may be, for example, about 48° C. If the battery temperature is greater than the second battery temperature threshold, then the second mode of cooling is not sufficient, and flow must go to operation 325, at which point the chiller 200 is activated and the control valve 140 is positioned to control flow through the combined loops in the third mode of cooling. However, if the battery temperature remains below the second battery temperature threshold, then flow can proceed to operation 330.

Figure 5:
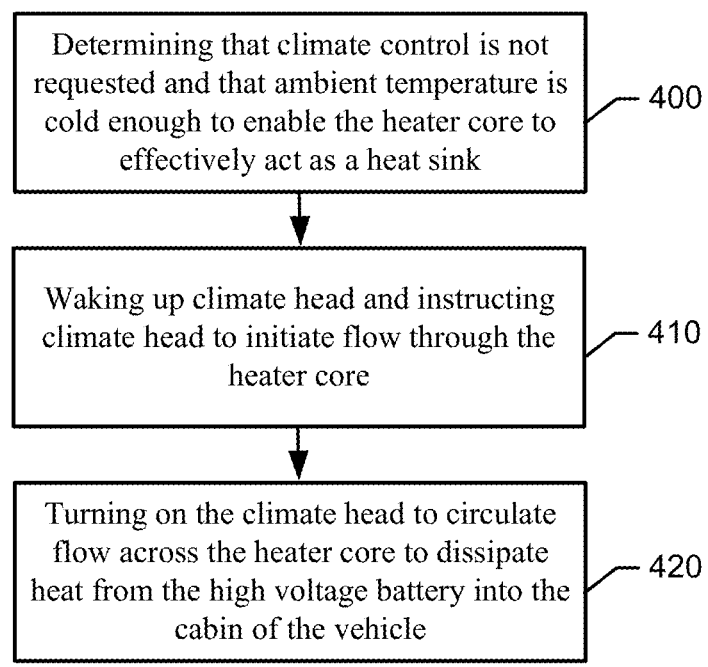
FIG. 5 illustrates a flow chart of a method of operating a climate head in accordance with an example embodiment.

FIG. 5 illustrates a flow chart showing how the control module 150 described above may interact with the climate control system 170 to use the heater core 230 as a heat sink. Given that the climate control system 170 is normally off when the vehicle 100 is charging (since the vehicle 100 is off), it may be necessary to wake the climate control head (i.e., climate head 180) of the climate control system 170. In this regard, as shown in FIG. 5, the control module 150 may determine (e.g., see operation 335 above) that climate control is not requested (so the heater core 230 is available for use) and that ambient temperature is cold enough to enable the heater core 230 to effectively act as a heat sink at operation 400. Thereafter, at operation 410, the control module 150 may initiate a wakeup call to the climate head 180 of the climate control system 170. The control module 150 may instruct the climate head 180 to initiate flow through the heater core 230 as part of operation 410. Thereafter, the climate head 180 may turn on, and may circulate flow across the heater core 230 to dissipate heat into the cabin of the vehicle 100 at operation 420. The flow that circulates may be fresh air from outside the vehicle 100 that is flowed across the heater core 230 (thereby providing a possible heat sink for transfer of heat from the high voltage battery 110). Thus, the cabin of the vehicle 100 may be heated with the excess heat generated by the charging of the high voltage battery 110. The climate control head may also control positioning of a mode door, air intake door, blend door, and blower speed selector to initiate the flow across the heater core 230. As mentioned above, this may not only perform some very low cost preconditioning of the cabin, but may also provide low cost cooling of the high voltage battery 110. The opportunistic use of the heater core 230 as a heat sink in this manner may therefore increase the speed of charging and/or the range of the vehicle 100. Meanwhile, if the customer should happen to enter the vehicle 100 (i.e., while still on-plug) and turn the vehicle on such that cabin heating or cooling is requested, then operation 315 of the example of FIG. 4 will ensure that cabin comfort commands override any system setup or prior instructions that involved use of the heater core 230 for opportunistic battery cooling.

A thermal management system for a plug-in electric vehicle is provided. The system may include a high voltage battery configured to power the vehicle, a refrigerant cooling circuit configured to be selectively operably coupled to the high voltage battery to cool the high voltage battery during charging of the vehicle, a cabin heater core cooling circuit configured to be selectively operably coupled to the high voltage battery to cool the high voltage battery during charging of the vehicle, a control valve operable to control a flow of battery coolant to the high voltage battery from the refrigerant cooling circuit and the cabin heater core cooling circuit, and a control module configured to selectively operate the control valve to select a mode of cooling the high voltage battery. At least one mode of cooling selectable by the control module is a combined mode in which both the refrigerant cooling circuit and the cabin heater core cooling circuit provide cooling to the high voltage battery.

The thermal management system (or the processing circuitry defining the control module) of some embodiments may include additional features, modifications, augmentations and/or the like to achieve further objectives or enhance operation. The additional features, modifications, augmentations and/or the like may be added in any combination with each other. Below is a list of various additional features, modifications, and augmentations that can each be added individually or in any combination with each other. For example, the control valve may be positionable to proportionally control an amount of the battery coolant that comes from respective ones of the refrigerant cooling circuit and the cabin heater core cooling circuit in the combined mode. In an example embodiment, the control valve may be positionable by the control module based on minimizing an amount of the battery coolant from the refrigerant cooling circuit and increasing the amount of the battery coolant from the refrigerant cooling circuit as needed to maintain a temperature of the high voltage battery within a predefined range. In some cases, another mode of cooling selectable by the control module may include isolating the cabin heater core cooling circuit and using only the refrigerant cooling circuit to cool the high voltage battery. In an example embodiment, a heater core isolation valve may be operated under control of the control module to isolate the cabin heater core cooling circuit. In some cases, another mode of cooling selectable by the control module may include utilizing only the cabin heater core cooling circuit to cool the high voltage battery. In an example embodiment, the control module may wake a climate head of a cabin climate system and requests air flow over a heater core of the cabin heater core cooling circuit to dissipate heat from the high voltage battery into a cabin of the vehicle. In some cases, the control module may receive an indication of ambient temperature, an indication of battery temperature, and an indication of whether cabin climate control is requested. The control module may be configured to select the mode of cooling the high voltage battery based on the indication of ambient temperature, the indication of battery temperature, and the indication of whether cabin climate control is requested. In an example embodiment, a first mode of cooling may be defined by utilizing only the cabin heater core cooling circuit to cool the high voltage battery, the combined mode may be a second mode of cooling, and a third mode of cooling may be defined by using only the refrigerant cooling circuit to cool the high voltage battery. Within this context, the first mode of cooling may be prioritized by the control module to be a most preferred mode and the third mode of cooling may be least preferred mode. In some cases, the first mode of cooling may be selected in response to no request for cabin climate control when ambient temperature is below an ambient temperature threshold, the second mode of cooling may be selected from the first mode of cooling in response to the indication of battery temperature exceeding a battery temperature threshold, and the third mode of cooling may be selected when the cabin climate control is requested or when the ambient temperature is above the ambient temperature threshold.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A thermal management system for a plug-in electric vehicle, the thermal management system comprising:
    a high voltage battery configured to power the vehicle;
    a refrigerant cooling circuit configured to be selectively operably coupled to the high voltage battery to cool the high voltage battery during charging of the vehicle;
    a cabin heater core cooling circuit configured to be selectively operably coupled to the high voltage battery to cool the high voltage battery during charging of the vehicle;
    a control valve operable to control a flow of battery coolant to the high voltage battery from the refrigerant cooling circuit and the cabin heater core cooling circuit; and
    a control module programmed to selectively operate the control valve to select a mode of cooling the high voltage battery based on a determination, made by the control module, whether the high voltage battery is currently charging due to the vehicle being on-plug and whether cabin climate control has been requested,
    wherein at least one mode of cooling selectable by the control module is a combined mode in which both the refrigerant cooling circuit and the cabin heater core cooling circuit provide cooling to the high voltage battery,
    wherein the control module is further programmed to, while in the combined mode, operate the control valve to prevent the flow of battery coolant from the cabin heater core cooling circuit such that all battery coolant passing through the control valve is flowing from refrigerant cooling circuit in response to cabin climate control being requested regardless of an ambient temperature.

2. The thermal management system of claim 1, wherein the control valve is positionable to proportionally control an amount of the battery coolant that comes from respective ones of the refrigerant cooling circuit and the cabin heater core cooling circuit in the combined mode when climate control is not being requested.

3. The thermal management system of claim 2, wherein the control valve is positionable by the control module based on minimizing an amount of the battery coolant from the refrigerant cooling circuit and increasing the amount of the battery coolant from the refrigerant cooling circuit as needed to maintain a temperature of the high voltage battery within a predefined range.

4. The thermal management system of claim 1, wherein another mode of cooling selectable by the control module includes isolating the cabin heater core cooling circuit and using only the refrigerant cooling circuit to cool the high voltage battery.

5. The thermal management system of claim 4, wherein a heater core isolation valve is operated under control of the control module to isolate the cabin heater core cooling circuit.

6. The thermal management system of claim 1, wherein another mode of cooling selectable by the control module includes utilizing only the cabin heater core cooling circuit to cool the high voltage battery.

7. The thermal management system of claim 6, wherein the control module wakes a climate head of a cabin climate system and requests air flow over a heater core of the cabin heater core cooling circuit to dissipate heat from the high voltage battery into a cabin of the vehicle.

8. The thermal management system of claim 1, wherein the control module receives an indication of ambient temperature, an indication of battery temperature, and an indication of whether cabin climate control is requested, and
wherein the control module is configured to select the mode of mode of cooling the high voltage battery based on the indication of ambient temperature, the indication of battery temperature, and the indication of whether cabin climate control is requested.

9. The thermal management system of claim 8, wherein a first mode of cooling comprises utilizing only the cabin heater core cooling circuit to cool the high voltage battery,
wherein the combined mode comprises a second mode of cooling,
wherein a third mode of cooling comprises using only the refrigerant cooling circuit to cool the high voltage battery, and
wherein the first mode of cooling is prioritized by the control module to be a most preferred mode and the third mode of cooling is least preferred mode.

10. The thermal management system of claim 8, wherein a first mode of cooling comprises utilizing only the cabin heater core cooling circuit to cool the high voltage battery,
wherein the combined mode comprises a second mode of cooling,
wherein a third mode of cooling comprises using only the refrigerant cooling circuit to cool the high voltage battery,
wherein the first mode of cooling is selected in response to no request for cabin climate control when ambient temperature is below an ambient temperature threshold,
wherein the second mode of cooling is selected from the first mode of cooling in response to the indication of battery temperature exceeding a battery temperature threshold, and
wherein the third mode of cooling is selected when the cabin climate control is requested or when the ambient temperature is above the ambient temperature threshold.

11. A control assembly for a thermal management system for a high voltage battery of a plug-in electric vehicle, comprising:
a control valve operable to control a flow of battery coolant to the high voltage battery from a refrigerant cooling circuit and from a cabin heater core cooling circuit, and
a control module programmed to selectively operate the control valve to select, for the high voltage battery, a cooling mode, wherein the cooling mode is selected to be one of a refrigerant only mode, a core mode, or a combined mode in which both the refrigerant cooling circuit and the cabin heater core cooling circuit provide cooling to the high voltage battery;
wherein the cooling mode is selected based on a determination, made by the control module, whether the high voltage battery is currently charging due to the vehicle being on-plug and whether cabin climate control has been requested;
wherein the control module is further programmed to, while in the combined mode, operate the control valve to prevent the flow of battery coolant from the cabin heater core cooling circuit such that all battery coolant passing through the control valve is flowing from refrigerant cooling circuit in response to cabin climate control being requested, regardless of an ambient temperature.

12. The control assembly of claim 11, wherein the control valve is positionable to proportionally control an amount of the battery coolant that comes from respective ones of the refrigerant cooling circuit and the cabin heater core cooling circuit in the combined mode when climate control is not being requested.

13. The control assembly of claim 12, wherein the control valve is positionable by the control module based on minimizing an amount of the battery coolant from the refrigerant cooling circuit and increasing the amount of the battery coolant from the refrigerant cooling circuit as needed to maintain a temperature of the high voltage battery within a predefined range.

14. The control assembly of claim 11, wherein another mode of cooling selectable by the control module includes isolating the cabin heater core cooling circuit and using only the refrigerant cooling circuit to cool the high voltage battery;
wherein a heater core isolation valve is operated under control of the control module to isolate the cabin heater core cooling circuit.

15. The control assembly of claim 11, wherein another mode of cooling selectable by the control module includes utilizing only the cabin heater core cooling circuit to cool the high voltage battery.

16. The control assembly of claim 11, wherein the control module receives an indication of ambient temperature, an indication of battery temperature, and an indication of whether cabin climate control is requested, and
wherein the control module is configured to select the mode of mode of cooling the high voltage battery based on the indication of ambient temperature, the indication of battery temperature, and the indication of whether cabin climate control is requested.

17. The control assembly of claim 16, wherein a first mode of cooling comprises utilizing only the cabin heater core cooling circuit to cool the high voltage battery,
wherein the combined mode comprises a second mode of cooling,
wherein a third mode of cooling comprises using only the refrigerant cooling circuit to cool the high voltage battery, and
wherein the first mode of cooling is prioritized by the cooling module to be a most preferred mode and the third mode of cooling is a least preferred mode.

18. The control assembly of claim 16, wherein a first mode of cooling comprises utilizing only the cabin heater core cooling circuit to cool the high voltage battery,
wherein the combined mode comprises a second mode of cooling,
wherein a third mode of cooling comprises using only the refrigerant cooling circuit to cool the high voltage battery,
wherein the first mode of cooling is selected in response to no request for cabin climate control when ambient temperature is below an ambient temperature threshold,
wherein the second mode of cooling is selected from the first mode of cooling in response to the indication of battery temperature exceeding a battery temperature threshold, and
wherein the third mode of cooling is selected when the cabin climate control is requested or when the ambient temperature is above the ambient temperature threshold.

* * * * *